Aug. 11, 1959
C. MEESE
2,898,789
HOSE CLAMP ASSEMBLY TOOL
Filed July 29, 1955
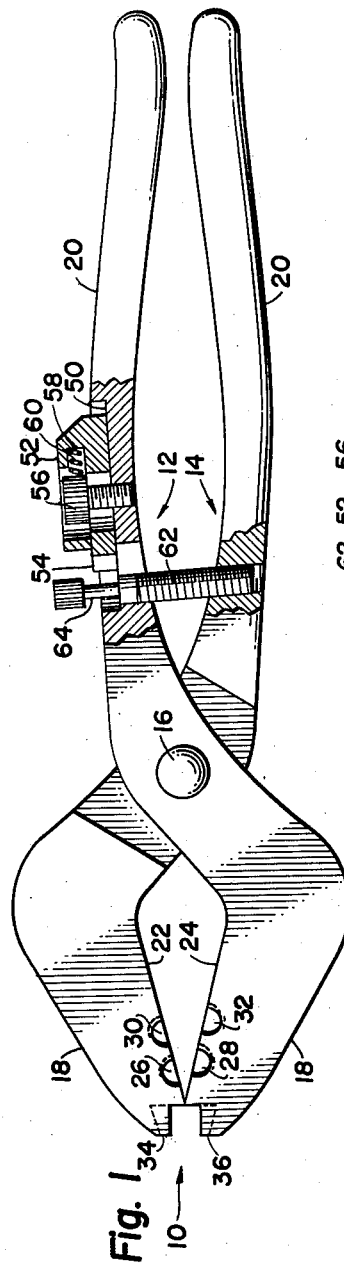
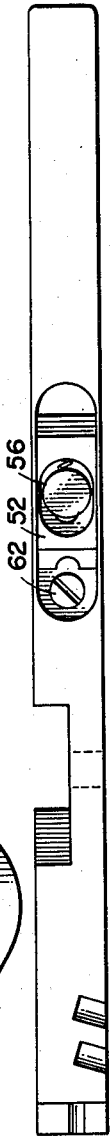
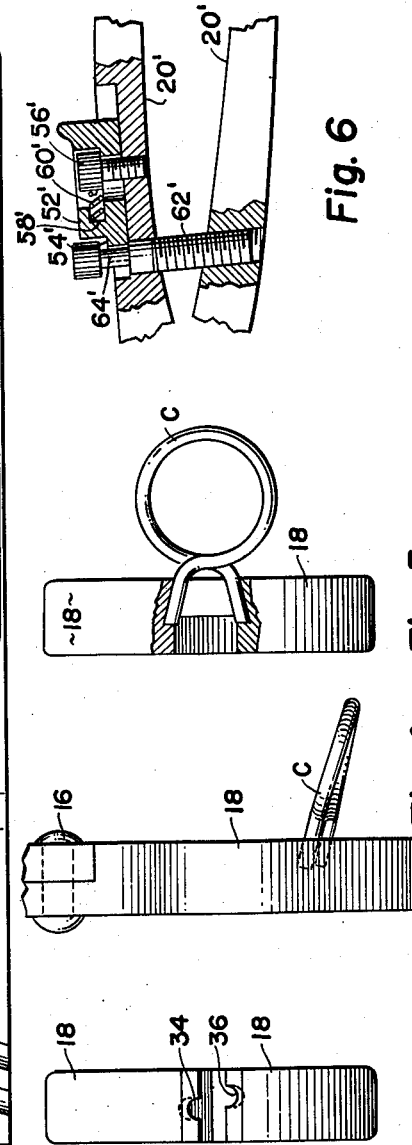
INVENTOR.
CLARENCE MEESE
BY
ATTORNEYS 2,898,789
Patented Aug. 11, 1959

2,898,789
HOSE CLAMP ASSEMBLY TOOL

Clarence Meese, New Philadelphia, Ohio, assignor to Eaton Manufacturing Company, Cleveland, Ohio, a corporation of Ohio Application July 29, 1955, Serial No. 525,151

7 Claims. (Cl. 81—9.3)

This invention relates to a plier type tool for spreading hose clamps and more particularly to a tool for spreading several different sizes of hose clamps particularly comprising a link of spirally wound wire.

Broadly, this invention comprehends the provision of a plier hand tool having a pair of members pivotal with respect to each other about points intermediate their lengths and forming a jaw having suitable grooves for engaging and moving ends of a spirally wound spring hose clamp. At the other side of the pivot and along the lengths of the members is provided a locking means for locking and maintaining the pliers in a position maintaining the mentioned jaws opened.

Many prior art plier devices have been devised for accomplishing the purpose of the instant pliers but such prior art pliers have had many inherent defects rendering them not as suitable or as effective as might be desired. As an example, in many cases the grooves in the plier jaws were inappropriately disposed so as to permit of spontaneous dislodgment of the clamp while in distended position in the pliers. In still other cases the grooves were inappropriately positionally and angularly disposed in the jaws as to restrict the freedom of manipulation of the hose in placing the same within the hose clamps.

Accordingly, it is an object of this invention to provide a hose clamp plier free of the defects of prior art pliers, including the above mentioned defects.

It is a further object of this invention to provide a hose clamp with jaw faces angularly disposed with respect to a center line, as to permit groves thereon, adaptable to accommodate for distension a plurality of sizes of hose clamps.

It is a further object of this invention to provide a hose clamp plier having grooves in the jaw thereof, so disposed angularly as to permit of ample clearance between the plier and hose to which the clamp is applied.

It is a still further object of this invention to provide a hose clamp plier having grooves in the jaws thereof disposed angularly as to permit initial full seating of the hose clamp wings along the entire length of the grooves rather than merely at the tip thereof.

It is a still further object of this invention to provide a hose clamp plier tool having a locking device for maintaining the clamp in distended position for any desired duration without any manual exertion whatever after an initial setting thereof.

It is a still further object of this invention to provide a hose clamp plier tool having a locking device including means automatically preventing the possibility of excessive distention of a hose clamp.

Other and further objects and advantages will become apparent from a more detailed description of the invention taken with the accompanying drawings in which:

Fig. 1 shows in partial cut-away view the plier tool and locking device of this invention, Fig. 2 is a top view of one member of the plier tool shown in Fig. 1, Fig. 3 is an end view of the plier tool shown in Fig. 1, Fig. 4 is a view showing the disposition of a hose clamp with respect to the plier tool when being gripped thereby, Fig. 5 is another view in partial section showing the disposition of a hose clamp with respect to the plier tool when being gripped thereby, and Fig. 6 is a cross-sectional view of a modified locking device of the invention.

Referring now more particularly to the drawing, 10 represents generally the plier tool having a pair of crossed members 12 and 14 pivotal about a rivet 16 and each having a jaw portion 18 and a handle portion 20.

Jaws 18 have adjacent opposed surfaces 22 and 24 which are disposed so as to be divergent with respect to each other at a suitable angle, preferably approximately 30°, when the jaws are in touching engagement at the respective extremities thereof. Along a portion of each of surfaces 22 and 24 opposed grooves 26, 28, 30 and 32 are provided for receiving and engaging wings of a hose clamp of the type shown at C in Figs. 4 and 5. Grooves 26 and 28 are provided to accommodate a clamp of one size and grooves 30 and 32 accommodate a clamp of greater size as may be clearly understood. Each of the grooves 26 and 30 as viewed in Fig. 1, extends from the plane of the paper, inwardly, upwardly and rearwardly and each of grooves 28 and 32 extends inwardly, downwardly and rearwardly. The divergence of each groove with respect to the inner surface of the jaw as shown more clearly in Fig. 5 is preferably of the order of 10°, it being, of course, paramount to provide a divergence to appropriately accommodate the clamp wings. The divergence of each groove with respect to a transverse axis of each jaw is preferably of the order of 15°, as shown most clearly in Fig. 2, although this divergence is also dependent upon the angularity of the clamp wings. It is further noted that grooves 28 and 32 are offset axially nearer rivet 16 than respective grooves 26 and 30 by the pitch of the helically wound hose clamps for which the tool is designed, to provide an even undistorted distention thereof.

In addition to the grooves already described, the plier tool of this invention is also provided with a pair of opposed grooves 34 and 36 extending in a general axial direction from the tip thereof. Grooves 34 and 36 are offset as observed in Fig. 3 and each is divergent with respect to the other as seen most clearly by the dotted lines in Fig. 1. Grooves 34 and 36 are proportioned and positioned to accommodate a hose clamp of different size from the clamps accommodated by the grooves heretofore described and also to provide for application of a clamp perpendicular to the plane of the pliers as contrasted to the use of the other grooves.

When gripped by the plier tool, hose clamps assume a position as shown in Figs. 4 and 5 and a force bringing handles 20 together effects a distention of the clamp to permit passage of a hose therethrough. It is also noted particularly in Fig. 4 that the angularity of the grooves or divergence with respect to the transverse axis causes the clamp C to assume an angular position to facilitate insertion or removal of a hose without obstruction by the other parts of the plier tool.

According to another feature of this invention, as shown in Fig. 1 of the drawing, provision is made for means to lock the plier tool and clamp in distended position when desired. Handle 20 of member 12 is recessed at 50 to receive therein a sliding latch 52 having a detent 54 at one end thereof. Latch 52 is provided with an opening therethrough to receive a screw 56 threadedly engaging handle 20 from within recess 50. Latch 52 is provided with a recess 58 in which a coil spring 60 is located, bearing at opposite ends against the head of screw 56 and one end of recess 58 to urge latch 52 in a rightwardly direction as viewed in Fig. 1.

A threaded stud 62 engaging a threaded hole in the handle 20 of member 14 extends through a hole in handle 20 of member 12. Stud 62 is reduced along a length 64 thereof for receiving and engaging detent 54 when latch 52 is urged toward stud 62. In the use of the lock described, a hose clamp is distended by insertion of clamp wings in appropriate grooves and the subsequent forcing of handles 20 together and latch 52 is moved to provide engagement of detent 54 with stud 62 at 64. While latch 52 is held in this position, handles 20 are released to allow the force of the clamp to urge the spreading of handles 20. Detent 54, however, engages stud 62 along one end of the reduced portion 64. Frictional forces involved retain the plier tool and clamp in this position thereafter, even without any manual attention. The plier tool is thereafter unlocked by enough force applied to handles 20 to cause the frictional forces holding latch 52 against stud 62 to be overcome by the force of spring 60 which returns the latch to the original position shown in Fig. 1.

According to a modification of the lock shown in Fig. 1, a locking arrangement is provided as shown in Fig. 6 wherein primed members representing corresponding unprimed numbers in other figures of the drawing are shown. According to this modification provision is made for urging a latch 52', against a stud 62' by means of a spring 60' located in a recess 58'. The locking device is automatically operative in response to a mere sufficient closing movement of handles 20 since spring 60' automatically urges latch 52' and detent 54' into recess 58' when the alignment is such as to allow such movement thus insuring against excessive distention of the clamp but requires manual movement of latch 52' away from stud 64' when frictional forces of stud 62' against detent 54' are reduced by movement of handles 20 toward each other.

As various variations and modifications could be made ing the hereinabove described constructions without deviating or departing from the scope of the invention, it is intended that all matter contained in the above description or shown in the accompanying drawings shall be interpreted as illustrative and not in a limiting sense.

What I claim is:

1. A hose clamp assembly tool comprising a pair of pivotally connected members including a pair of opposed jaws having a pair of cooperative, opposed grooves in adjacent, opposed surfaces said opposed surfaces having abutting end portions thereon remote from the pivotal connection between said members, said opposed surfaces being spaced intermediate said end portions and said pivotal connection and being convergent toward said end portion, each groove being divergent with respect to a plane passing through said pivotal connection and said abutment and having the axis of said pivotal connection and the point of contact of said abutment therein, one of said grooves extending in a direction from said plane into one of said jaw surfaces and extending from one side of said one jaw toward the other side thereof, and the other of said grooves extending in a direction from said plane into the other of said jaw surfaces and extending from one side of said other jaw toward the other side thereof.

2. A hose clamp assembly tool comprising a pair of pivotally connected members including a pair of opposed jaws having divergent, adjacent, opposed surfaces, each of said surfaces having a groove therein, each groove extending from one side of the jaw, toward the other side thereof and having an axis divergent with respect to a plane passing through said pivotal connection and said abutment and having the axis of said pivotal connection and the point of contact of said abutment disposed therein, extending in a direction from said plane into said inner surface of said jaw, and one of the grooves being located nearer said pivot than the other groove.

3. A hose clamp assembly tool comprising a pair of pivotally connected members including a pair of opposed jaws having divergent adjacent opposed surfaces, each of said surfaces having at least one groove wherein said groove extends from one side of the jaw, toward the other side thereof and progressively increases in depth from said first mentioned side along the length thereof, with said groove terminating in the jaw at the depth from said surface substantially beneath the depth of the groove opening with said groove end being closer to said pivotal point than said groove opening.

4. A hose clamp assembly tool comprising a pair of pivotally connected members including a pair of divergently opposed jaws, a pair of opposed grooves in said jaws, each groove extending from the free end of one of said jaws toward the other end of said one jaw and being divergent with respect to each other and having axes in spaced parallel planes.

5. A hose clamp assembly tool according to claim 1 wherein said members additionally comprise a pair of handles, locking means cooperative with said handles including a spring biased latch slidable along a portion of one of said handles, a stud threadedly engaging one of said handles and extending through the other of said handles, said stud being reduced along a portion thereof for receiving a portion of said latch to restrict the pivotal movement of said members.

6. A hose clamp assembly tool according to claim 4 additionally comprising a pair of handles for actuating said jaws, locking means cooperative with said handles including a latch slidable along a portion of one of said handles, a stud threadedly engaging one of said handles and extending through the other of said handles, said stud being reduced along a portion thereof for receiving a portion of said latch to restrict the movement of said members and spring means operative between said latch and one of said members for urging said latch against said stud to automatically lock said tool in a predetermined position of distention thereof.

7. A hose clamp assembly tool comprising a pair of pivotally connected members including a pair of opposed jaws having abutting free end portions remote from said pivotal connection, one of said free end portions having a surface thereon, a groove in said surface of said one free end portion extending divergently with respect to a plane passed through said pivotal connection and said abutment having the axis of said pivotal connection and the point of contact of said abutment disposed therein, in a direction from said one free end portion and said plane toward said pivotal connection, the other of said free end portions having a surface thereon opposed to said surface on said one free end portion, a groove in said surface of said other free end portion extending divergently with respect to said plane in a direction from said plane and said other free end portion toward said pivotal connection, and said grooves having their axes lying in parallel spaced planes.

References Cited in the file of this patent

UNITED STATES PATENTS

| 1,772,428 | Palotce | Aug. 5, 1930 |
| 2,677,982 | Arras | May 11, 1954 |